(12) United States Patent
Mathwig et al.

(10) Patent No.: US 10,311,402 B1
(45) Date of Patent: Jun. 4, 2019

(54) SYSTEM AND METHOD FOR ELECTRONIC COLLABORATION

(75) Inventors: Jeffrey Dean Mathwig, Worthington, OH (US); Carl Milton Dashfield, Columbus, OH (US); Matthew J. Hill, Bayonne, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 1268 days.

(21) Appl. No.: 13/079,396

(22) Filed: Apr. 4, 2011

(51) Int. Cl.
*G06Q 10/10* (2012.01)

(52) U.S. Cl.
CPC .................................. *G06Q 10/10* (2013.01)

(58) Field of Classification Search
CPC ...... G06Q 10/10; G06Q 20/108; G06Q 40/00; G06Q 20/10; G06Q 20/1085; G06F 17/30011; G06F 17/30165
USPC .......................... 705/42, 43, 14.53, 36 R, 38
See application file for complete search history.

(56) References Cited

U.S. PATENT DOCUMENTS

| | | | | |
|---|---|---|---|---|
| 5,220,501 | A * | 6/1993 | Lawlor | G06Q 20/04 379/93.18 |
| 5,870,724 | A * | 2/1999 | Lawlor | G06Q 20/04 235/379 |
| 6,266,683 | B1 | 7/2001 | Yehuda et al. | |
| 7,698,212 | B1 * | 4/2010 | Peirson | G06Q 20/10 705/38 |
| 7,865,913 | B2 * | 1/2011 | Hu | G06Q 10/10 719/330 |
| 7,895,229 | B1 * | 2/2011 | Paknad | G06Q 10/10 707/640 |
| 8,606,678 | B2 * | 12/2013 | Jackowitz | G06Q 40/00 345/473 |
| 2002/0129056 | A1 * | 9/2002 | Conant | G06Q 30/06 715/255 |
| 2002/0129257 | A1 * | 9/2002 | Parmelee | G06Q 20/108 713/180 |

(Continued)

OTHER PUBLICATIONS

Internet page printed Apr. 1, 2011; "Electronic Signature Law and CIC's eSignature Products"; 2000-2010 Communication Intelligence Corporation; White Paper—www.cic.com.

(Continued)

*Primary Examiner* — Cho Kwong
(74) *Attorney, Agent, or Firm* — Hunton Andrews Kurth LLP (57) ABSTRACT

Systems and methods of the present invention provide for electronic collaboration between at least two computing devices. The collaboration has a plurality of applications for scenarios requiring review and signing of documents. The collaboration may be based on a loose coupling of the computing devices and may enable a coordinated collaboration. An internet connection may be used to establish and conduct the collaboration. For example, the collaboration may be used to provide interaction between a financial institution and its representative and a customer. The collaboration may be used to review documents and information. Electronic signature capture capability may be provided. The system may be provide for active collaboration between the electronic devices with one device being able to monitor and view actions taken upon a second device. The collaboration and interaction may be extended to multiple electronic devices.

28 Claims, 3 Drawing Sheets

(56) References Cited

U.S. PATENT DOCUMENTS

| | | | | |
|---|---|---|---|---|
| 2004/0044739 | A1* | 3/2004 | Ziegler | G06Q 20/02 709/213 |
| 2006/0053380 | A1* | 3/2006 | Spataro | G06F 17/30011 715/753 |
| 2006/0074804 | A1* | 4/2006 | Cinar | G06Q 20/108 705/42 |
| 2006/0117042 | A1* | 6/2006 | Hu | G06Q 10/10 |
| 2007/0150351 | A1* | 6/2007 | Libman | G06Q 10/0631 705/14.53 |
| 2010/0094774 | A1* | 4/2010 | Jackowitz | G06Q 40/06 705/36 R |
| 2011/0040630 | A1* | 2/2011 | Weiss | G06Q 30/0269 705/14.66 |
| 2011/0087985 | A1* | 4/2011 | Buchanan | G06F 3/04847 715/771 |

OTHER PUBLICATIONS

Internet page printed Apr. 1, 2011; "Understanding Electronic Signatures"; 2000-2008 Communication Intelligence Corporation; White Paper—www.cic.com.

Internet page printed Apr. 1, 2011; "SignatureOne Suite"; www.cic.com/products/.

Internet page printed Apr. 1, 2011; PRONTO: Flexibility that Delivers; PRONTO: Flex-Deployment and Flex-Pricing; www.alphatrust.com/products.

Internet page printed Apr. 1, 2011; Electronic Signature Overview; www.alphatrust.com/solutions/esignature/.

Internet page printed Apr. 1, 2011; "Electronic Presentation and E-Signature for Electronic Forms, Documents and Business Records"; Alphatrust Pronto Product Family; AlphaTrust Electronic Signature White Paper; Aug. 2008.

Internet page printed Apr. 1, 2011; "Signature Pads"; www.eoriginal.com/solutions/signature-pads/.

Internet page printed Apr. 1, 2011; "DocumentLAUNCH"; www.assuresign.com/documentlaunch.html.

Internet page printed Apr. 1, 2011; "DocumentTRAK"; www.assuresign.com/documenttrak.html.

Internet page printed Apr. 1, 2011; "DocumentNOW"; www.assuresign.com/documentnow.html.

Internet page printed Apr. 1, 2011; "Industry Applications"; www.assuresign.com/assuresign-applications.html.

Internet page printed Apr. 1, 2011; "ESIGN & UETA Compliant Signatures"; www.assuresign.com/index.html.

Internet page printed Apr. 1, 2011; "Electronic Signature general and application FAQ"; www.topazsystems.com/faq/generalfaq.

Internet page printed Apr. 1, 2011; eSign IT Guide; "Understanding Technology, Methods, and Authentication"; 2004-2006 Topaz Systems; www.topazsystems.com.

Internet page printed Apr. 1, 2011; "Features List"; www.eoriginal.com/solutions/features-list.

Internet page printed Apr. 1, 2011; "Compare Silanis' Electronic Signature Solutions"; www.silanis.com/solutions/compare-solutions.

* cited by examiner

SYSTEM AND METHOD FOR ELECTRONIC COLLABORATION

FIELD OF THE INVENTION

The invention relates generally to providing financial services and provides for collaboration between a financial institution and a customer in providing such services.

BACKGROUND OF THE INVENTION

For many banking or financial transactions and services, a customer or client is required to review various documents and provide his/her signature on those documents. A representative of the financial institution generally provides guidance and answers questions from the customer. Collaboration between the customer and the representative is cumbersome because the representative has to be prompted by the customer regarding any questions or further information required by the customer and the representative is not always aware of where the customer is the document review process, unless notified by the customer. Once the forms are reviewed and signed, they must be indexed, filed, and in many cases, are electronically scanned for long term storage. Such functions are administratively intensive.

These and other deficiencies exist.

SUMMARY OF THE INVENTION

Exemplary embodiments include a computer implemented method for communicatively coupling a first computing device with a second computing device. The coupling may be a loose coupling to provide collaboration between the devices. This collaboration may be coordinated and may be independent of the application. The communicative coupling may be performed using an internet or computer network based connection. Information is electronically captured from a customer. One or more documents pertaining to a transaction in which the customer desires to engage are retrieved. One or more information fields in the one or more documents are automatically populated. Access is granted to the first and second computing devices to the one or more documents. The one or more documents are displayed on the second computing device. Inputs, from the second computing device, are received that comprise interaction between the customer and the one or more documents. Events associated with the second computing device are forwarded to the first computing device, wherein the events comprise at least the inputs. The one or more documents are electronically stored. The one or more documents are posted for subsequent access by the customer. An electronic notification is sent to the customer that the one or more documents are posted for access.

Exemplary embodiments include a computer implemented system comprising a first computing device, a second computing device, one or more servers, and a computer based network communicatively coupling the first computing device, the second computing device, and the one or more servers. The one or more servers re configured to: retrieve one or more documents pertaining to a transaction in which a customer desires to engage; automatically populate one or more information fields in the one or more documents; grant access to the one or more documents to the first and second computing devices; cause the display of the one or more documents on the second computing device; process inputs received from the second computing device that comprise interactions between the customer and the one or more documents; receive events from the second computing device; forward the events to the first computing device; store the one or more documents; post the one or more documents for subsequent access by the customer; and send an electronic notification to the customer that the one or more documents are posted for access.

Other exemplary embodiments include a computer implemented method for communicatively coupling a first computing device with a second computing device, wherein a first user is associated with the first computing device and a second user is associated with the second computing device. One or more documents for the first user and the second user to collaborate on are retrieved. Access is granted to the first and second computing devices to the one or more documents. The one or more documents are displayed on the first and second computing devices. Inputs are received, from the second computing device, comprising interaction between the second user and the one or more documents. Events, comprising at least the inputs, associated with the second computing device are forwarded to the first computing device. The one or more documents are electronically stored for subsequent access by the first and second users.

Advantages of this invention in addition to those described above are apparent from the following detailed description of the exemplary embodiments.

These and other embodiments and advantages of the invention will become apparent from the following detailed description, taken in conjunction with the accompanying drawings, illustrating by way of example the principles of the various exemplary embodiments.

DETAILED DESCRIPTION OF THE PREFERRED EMBODIMENTS

It will be readily understood by those persons skilled in the art that the embodiments of the inventions described herein are capable of broad utility and application.

Accordingly, while the invention is described herein in detail in relation to the exemplary embodiments, it is to be understood that this disclosure is illustrative and exemplary of embodiments of the invention and is made to provide an enabling disclosure of the invention. Accordingly, the disclosure is not intended to be construed to limit the embodiments of the invention or otherwise to exclude any other such embodiments, adaptations, variations, modifications and equivalent arrangements. While the various embodiments of the present invention are described in the context of financial services and financial institution customer service, the methods and systems described herein may be applied to other related items, such as other types of financial transactions or accounts or related transactions where collaboration may be required.

The following descriptions are provided of different configurations and features according to exemplary embodiments. These configurations and features may relate to providing financial services. Such financial services may be provided through branch offices and electronically over a computer network, such as the Internet. While certain nomenclature and types of applications/hardware are described, other names and application/hardware usage is possible and the nomenclature provided is done so by way of non-limiting examples only. Further while particular embodiments are described, it should be appreciated that the features and functions of each embodiment may be combined in any combination as is within the capability of one of ordinary skill in the art. The attached Figures provide additional details regarding the present invention. It should also be appreciated that these exemplary embodiments are provided as non-limiting examples only.

Figure 1:
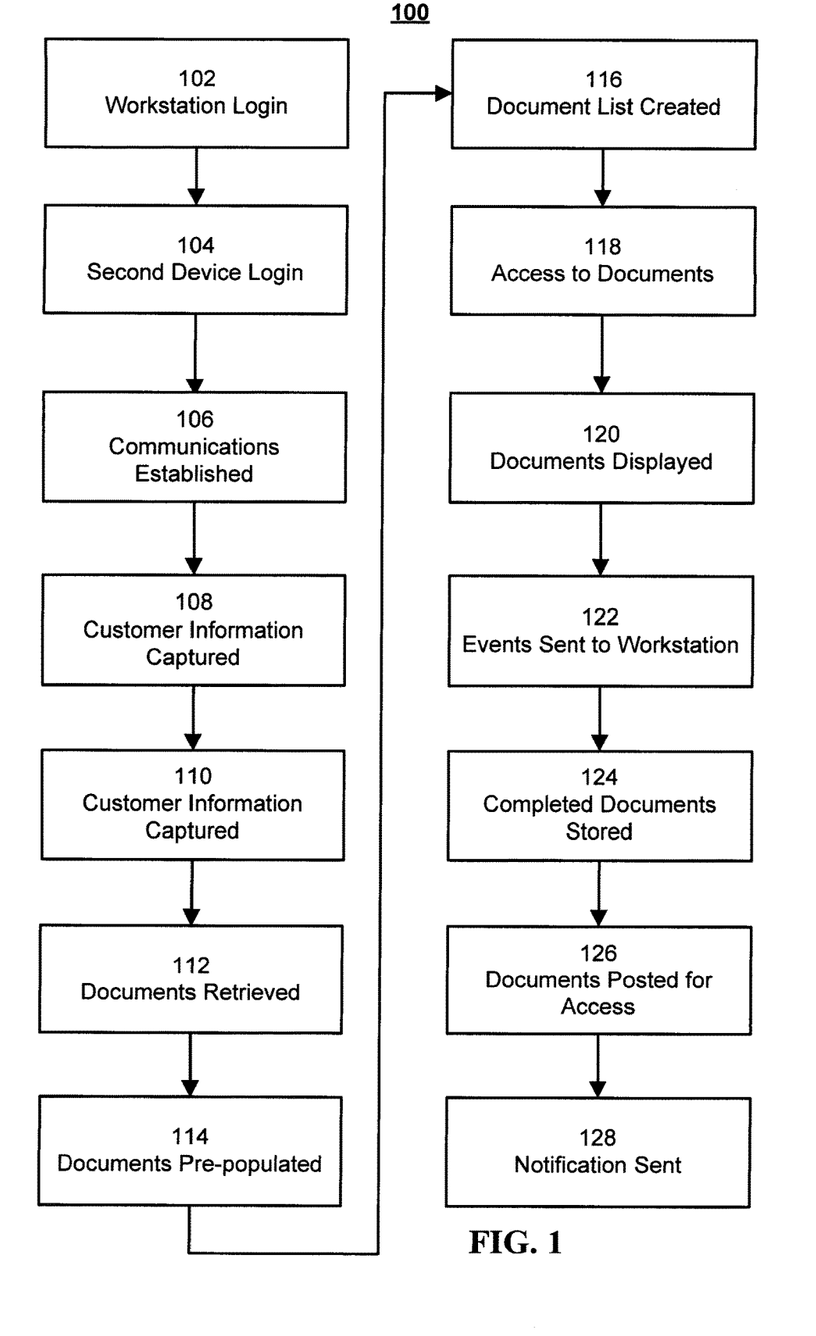
FIG. 1 is a flow chart of a method of collaboration in accordance with an exemplary embodiment of the invention.

FIG. 1 depicts a flow chart of a method of collaboration using a portable electronic device according to exemplary embodiments of the invention. Exemplary method 100 is provided by way of example, as there are a variety of ways to carry out the methods disclosed herein. The method 100 as shown in FIG. 1 may be executed or otherwise performed by one or a combination of various systems, such as a computer implemented system. Each block shown in FIG. 1 represents one or more processes, methods, and/or subroutines carried out in the exemplary method 100. Each block may have an associated processing machine or the blocks depicted may be carried out through one processor machine.

At block 102, a workstation or first computing device is logged into. The workstation may a computer. For example, the workstation may be desktop or laptop computer. In some embodiments, the workstation may be a thin client, such that the majority of the processing may be performed in the other components of the system, or a thick client, such that the majority of the processing may be performed on the workstation. The workstation may be a portable computing device. For example, the workstation may be a computing device that is the same as or similar to the device described at block 104. The workstation may be communicatively coupled to one or more servers or other computing devices that electronically interact during the method described herein. The workstation may be communicatively coupled to one or more computer networks through a wireless or wired connection. For example, data may be transmitted and/or received using an Ethernet connection, a fiber connection, a traditional phone wireline connection, a cable connection or other wired network connection. The workstation may have peripheral devices attached thereto. For example, the workstation may have a printer and scanner associated therewith or a multi-function type device associated therewith. The peripheral device(s) may be connected to a computer network.

According to exemplary embodiments, the workstation may be logged into by a representative of a financial institution or other first user. The workstation may be located at a financial institution. Upon logging into the workstation or at a later point, the representative may select, through an application, widget, program, and/or interface, a particular transaction or action to conduct. The action may be chosen from a menu or selection of actions and transactions to conduct. For example, the transaction may include opening a new account, changing an existing account, enrolling in or altering a program, obtaining a loan, etc. This list of actions is meant to be exemplary and non-limiting. In other embodiments, as described herein, the particular transaction desired may not be known until further interaction with the customer occurs.

At block 104, a second computing device is logged into. The representative may log into the second device. Alternatively, a second user or customer may log into the second device. The second device may be a portable electronic device. For example, the second device may be a tablet computing device. Other portable electronic devices may be used such as, by way of non-limiting examples, mobile phones (e.g., cell or cellular phones), smart phones (e.g., iPhones, Android based phones, or Blackberry devices), personal digital assistants (PDAs) (e.g., Palm devices), laptops, netbooks, or other portable computing devices. The second device may have a display screen that is touch sensitive. The display screen may accept touch inputs from a human finger or other device, such as a stylus or pen. In some embodiments, input to the second device may be performed using a keyboard or a pointing device. For example, a mouse or touch-pad may be used to perform inputs. A virtual keyboard may be displayed on the screen of the second device for inputs; that is, the keyboard may be used via the touch screen. A combination of input devices and methods may be used. The second device may be associated with or owned by the financial institution.

According to some embodiments, as described above, the second device may be associated with or owned by the customer. For example, the second device may be owned by the customer such that the second device is a personal portable electronic device that the customer owns and has control over. Further, more than one second device may be present. For example, there may be two or more second devices. Accordingly, the steps of the method described herein may be applied to such multiple devices. The multiple devices may each conduct the method steps and may each communicate with (such as transmitting to and receiving data from) the workstation.

The second device may have a number of applications, widgets, interfaces, and/or programs installed. For example, in the embodiment of the financial institution's portable electronic device, the second device may have certain software installed. For example, one or more applications, widgets, interfaces, and programs may be installed to support the embodiments described herein. Additional applications, widgets, interfaces, and programs may be installed. In the embodiment of the customer associated or owned second device, the customer may have to install one or more applications, widgets, interfaces, and/or programs to perform the embodiments described herein. The financial institution may program such software to the customer. For example, any required software may be downloaded through the financial institution's website or otherwise provided to the customer.

At block 106, communications are established. The communications may be established between the workstation and the second device such that the workstation and the device are communicatively coupled. The workstation and the second device may be communicatively coupled through a server such that the server may handle communications between the workstation and the second device. The communications may be established for correlating the logins between the two devices. For example, the same SID may be used to log into the workstation and the second device. This may enable communications to be established between the workstation and the second device. Communications with other computing devices may be established. For example, communications with one or more servers and/or file storage devices may be established. The communicative coupling may be of a loose nature. For example, the coupling may be of an unobtrusive nature between the workstation and the second device. The user of the second device may be unaware of the coupling with the workstation.

Communications may be electronically established over a wireless network between the second device and workstation. For example, the workstation and the second device may communicate and/or transmit/receive data using a wireless signal. The wireless signal may consist of Bluetooth, Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Transmission Control Protocol/Internet (TCP/IP) Protocols, or other protocols and/or systems suitable for transmitting and receiving data from the second device. A standard wireless protocol may be used. For example, the wireless protocol may include IEEE 802.11a, 802.11b, 802.11g, and 802.11n.

Alternatively, the workstation and the second device may communicate over a wired network. For example, data may be transmitted and/or received using an Ethernet connection, a fiber connection, a traditional phone wireline connection, a cable connection or other wired network connection.

At block 108, collaboration is configured. The collaboration is configured between the workstation and the second device. The desired collaboration may be configured as part of the establishment of communications between the workstation and the second device. For example, the correlation of the log in between the workstation and the second device may establish the collaboration. A selection may be made, through an application, widget, program, and/or interface, a particular action to conduct on the workstation and the second device. This action may be chosen from a menu or selection of transactions. For example, the action may be opening a new account as described above. This collaboration may be independent of the application(s) involved. For example, the workstation and the second device may be running different applications but the collaboration may still occur. The workstation and the second device may have different web browsers, for example, to use as part of the method. As described above, the user of the second device may be unaware of the collaboration with the workstation. The workstation user may be aware of the collaboration.

At block 110, customer information is captured. The customer information may be captured from an identification card or passport associated with the customer. For example, the customer may provide a driver's license which may be scanned to capture the customers information, such as name, address, date of birth, picture, signature, and id number. Other information may captured from the identification card or obtained directly from the customer. A digitally imaging card slot communicatively coupled to the workstation may be used. The information may be captured using character recognition. Once this information is captured or entered at the workstation, such information may be correlated or associated with the customer's account information. The correlation may occur through a customer account server and/or database associated with the financial institution. Such account information may be stored in a database associated with the financial institution. According to exemplary embodiments, once the customer information is captured, such information may be stored for future use and retrieval in other transactions.

At block 112, the documents are retrieved. The documents may be retrieved from a content server or database. The documents may be placed into a temporary file store or other location to await further action. The documents retrieved may be based upon the selected transaction. For example, the transaction may involve opening a new credit account for a new credit card. The forms required for this transaction may be retrieved. The use of the term "documents" is meant to be non-limiting and encompass a variety of forms, requests, brochures, lists, web pages, legal notices, images, etc. that would be associated with financial services and products.

In some embodiments, the customer may be required to input information for the financial institution. For example, a profile may be required to completed. The results of the profile may be provided to the workstation for review by the representative. This profile may be used to provide tailored recommendations or marketing to the customer. Such recommendations may be provided from the workstation to the second device during the session. The workstation may use an appropriate engine or decisioning tool which reviews the customer's profile and produces one or more recommendations to offer the customer. For example, the customer may be a 24 year old female who is a recent college graduate. A particular credit card or account type may be recommended for this customer based on an analysis of this program and a the financial institution's offered programs and accounts. The representative may present this offer to the customer. Secondary offers may also be presented as alternatives or additions to the recommended offer. The offer(s) may be presented electronically by being pushed to the second device to be displayed for the customer to review. The representative may then guide the customer through the recommendations. The customer's responses may be used to determine the documents to be retrieved. For example, the customer may accept the recommended offer so the documents to complete the account registration would be required. In some embodiments, the customer may desire a different offer. The workstation may have a guidance display for the representative to go through the recommendations. For example, the representative may be provided with a display with a layout of the offers and particular talking or selling points for each presented offer. The representative may be provided with a mirror of the second device's display in order to have the same view as the customer. The representative may then be able to collaboratively interact with the customer.

At block 114, the documents are pre-populated with customer information. Customer information may be electronically filled into the documents in appropriate locations. The customer information may be based on that information captured from the identification card or that obtained from the database. For example, the documents may be pre-populated with the customer's name, address, email, account number, date of birth, etc. These examples are meant to be exemplary and non-limiting. The pre-population may occur automatically within the system. The information to pre-populate may be from previous transactions with the customer. By storing all information provided by the customer, the information may be used in the future to support other transactions so that the customer is not required to provide it again.

In some embodiments, prior to the pre-population, the customer may be asked to verify the customer's information. The verification may occur through a display on the second device. The customer may be presented with options to edit the customer information. Following such verification, the documents may be pre-populated.

At block 116, the document list is sent to the workstation and the second device. The workstation may contact a server for the documents. The documents may be pushed to the workstation and the second device by the workstation or server. A list of available documents may be electronically provided to both the workstation and the second device and an index, file, or folder structure may be created or provided.

At block 118, the documents are accessed. The second device may access the documents from the file store. A set of conversions on the documents may be conducted for display on the second device. The first device may access the documents also. A set of conversions may be conducted for display on the first device.

At block 120, the documents are displayed. An appropriate interface for navigating and displaying the documents may be provided on the second device. For example, a web-based interface may be provided to navigate the documents. The first device may have a similar interface for navigating the documents. In some embodiments, the first device may have a different interface than the second device.

Prior to display of the documents, a personalized welcome screen may be display on the second device. The screen may be personalized for the customer. For example, the screen may say "Welcome [name of customer]." Other greetings may be displayed.

As part of the document display, the customer may be able to input information into the documents through the interface provided with the second device. The customer may be required to provide input to certain sections. For example, the customer may be required to answer questions at certain points in the documents and fill-in required information. The customer may electronically sign the documents as part of the transaction. The customer may be required to acknowledge review of certain information by checking or initialing a box or other designated area. The customer's full signature may be only required on certain documents. The customer may be required to review and consent to the electronic review and signature of the documents for the transaction.

According to some embodiments, more than one second device may be used and/or required. For example, the transaction may require or involve a second customer, such as a co-signer or joint account owner. For these types of situations, an additional device may be provided. The additional device may be logged into and establish communications as described above. The additional device may establish a collaborative or interactive relationship to the workstation. The additional device may display the same documents as the second device. Alternatively, the additional device may display different documents from the second device. Information may be captured from the additional device as described for the second device. The workstation may display the events from the additional device as for the second device. More than one additional device may be required. For example, two or more additional devices may be used. Each additional device may be capable of performing the functions described herein. The additional devices may display the same documents as the second device or the other additional devices. Alternatively, each additional device may display different documents and receive different inputs. In some embodiments, the additional devices may be geographically separated from the workstation. These additional devices may be associated with different users or customers.

According to some embodiments, an opt-out feature may be provided such that the customer may terminate the electronic review and proceed with a review and signing of hard-copy or physical documents. The documents reviewed to the point of opt-out may be archived and stored and the physically reviewed documents may be preserved as a definitive record of the transaction. Alternatively, the documents reviewed prior to the opt-out may be deleted from the system. If the customer changes their mind, the transaction may be restarted from the beginning with a new set of documents pertaining to the transaction.

At block 122, events are sent to the workstation. During review and manipulation of the documents on the second device, the workstation may receive inputs from the second device. These inputs provide information to the workstation such that the workstation may display the same information being displayed upon the second device. The workstation may display additional information received from the second device such as any actions taken upon the device and the length of time a document has been displayed. The representative may then be able to collaboratively interact with the customer. It should be appreciated that that the workstation may receive such information and interaction from any additional devices present.

It should appreciated that the document review process may be iterative in nature. The customer may review and complete a first set of documents which may determine whether a second or subsequent set is presented for review and completion. For example, the customer may be opening a credit account. Following completion of the account documents, the customer may be asked to select a credit card design. More than two sets of documents may be required. For example, the customer may be opening a checking account. The customer may review and complete the initial account documents. The customer may desire to transfer funds into the new account. The customer may then be asked to select a check design and place an order for those checks. Finally, the customer may be asked to select a debit card design for use with the checking account.

During intervals between the document sets, a splash screen may be displayed on the second device to let the customer know what is going on. For example, the splash screen may state "Please wait while we set-up your account." The customer may be prompted to select the next step to be completed for the transaction. Advertising or offers may be presented to the customer in these intervals. The customer may be able to select links and receive information about the products or services offered in the advertising.

At block 124, the completed documents are stored. Upon completion of required actions the documents are forwarded for storage. For example, upon completion of document review and electronic signing, the documents are electronically forwarded from the second device to a server for storage. The storage process may involve digitally formatting and indexing the documents for storage. For example, the copies of the documents reviewed by the customer may be watermarked as such. In some embodiments, the transaction may not be completed in one session. The transaction may be put into a suspended or pending state and then resumed at a later session, be able to resume at the same point where it left off. For example, the customer may wish to review the documents in more detail outside of the session. The session may be suspended. The documents may be provided to the customer, either electronically or hard copy, for review. When the customer returns and the session is resumed, the second device's display may be returned to the point where the session with suspended; that is, the display at the second session may be the same as when the first session was suspended at the point in the document(s) where the customer was. Alternatively, the session may restart from the beginning to ensure a complete review of the documents is accomplished and the previous documents may be deleted.

It should be appreciated that during the transaction the customer may provide supporting documents for the transaction. For example, the customer may have to produce a current pay statement to support a loan application. These supporting documents may be digitally imaged into the system using an appropriate peripheral device which may be communicatively coupled to the workstation. For example, the representative may scan the documents using a scanner or multi-function device. Once digitally imaged, the supporting documents may be formatted, indexed, and/or watermarked. The supporting documents may be stored with the completed transactions documents and made available for future transactions and access by the financial institution and the customer in the same manner as the completed documents.

During the review process, an audit trail may be logged. This audit trail may be a record of what occurred during the review and signing process. The audit trail may be stored with the documents. According to some embodiments, the documents and audit trail may be hashed and cryptographically sealed to provide a secure record of the transaction.

All documents reviewed by the customer, whether physically reviewed or electronically reviewed, or provided by the customer, may be stored. The documents may be tagged or watermarked appropriately to indicate the status of the document, including indicating the "official" signed versions of the documents, either electronically signed or physically signed. The documents and audit trail may provide a tracking of all events that occurred during the transactions.

At block 126, the completed documents are posted for access. The posting may be to a web server for access through an Internet site. A specified file server and database may be used to support access to the documents. Through the access, the customer may be able to view, download, and/or print the documents. In some embodiments, the method may be provided for correcting errors in the documents. In correcting a document, the process described herein may be followed from the beginning with a new, corrected document. The corrected document may replace all prior versions of the document to ensure that an accurate document is archived. According to some embodiments, the documents may be printed for the customer following the transaction.

At block 128, a notification is sent. The notification may be to the customer regarding the posting of the completed documents for access. The notification may be sent to the customer electronically. For example, the notification may be sent to the customer via electronic mail, text message, and/or a Short Message Service (SMS) message. According to some embodiments, the customer may configure a notification method.

According to some embodiments, the customer and the financial institution representative may be physically separate. For example, the customer may be located in one geographic location and the representative may be a second geographic location. The customer may be using their own portable electronic device as the second device. The portable electronic device may have an Internet connection. In some embodiments, the customer may be located at a branch office of the financial institution and have their personal portable electronic device connected to the financial institution's network, either by a wireless or wired connection. The representative may be located in a different location. For example, the representative may be located at another branch office of the financial institution.

The method 100 may be applied in this configuration. However, an added video and audio link capability may be required. The workstation and the second device may have a digital imaging device, such as a camera. This capability may be used to allow the customer and the representative to view each other. They may view a digitally transmitted image upon the display of the desktop and the second device. The digital imaging device may enable the customer to interact on a real-time basis with the representative to complete the transaction. An audio capability may be provided. The audio capability may be a part of the video capability. For example, the desktop and second device may have access to Skype or other video messaging services. As part of the login process and connection process described above, the video and audio links may be established. According to some embodiments, a real time chat or other messaging capability may be used in place of or in addition to the video and audio capability.

Figure 2:
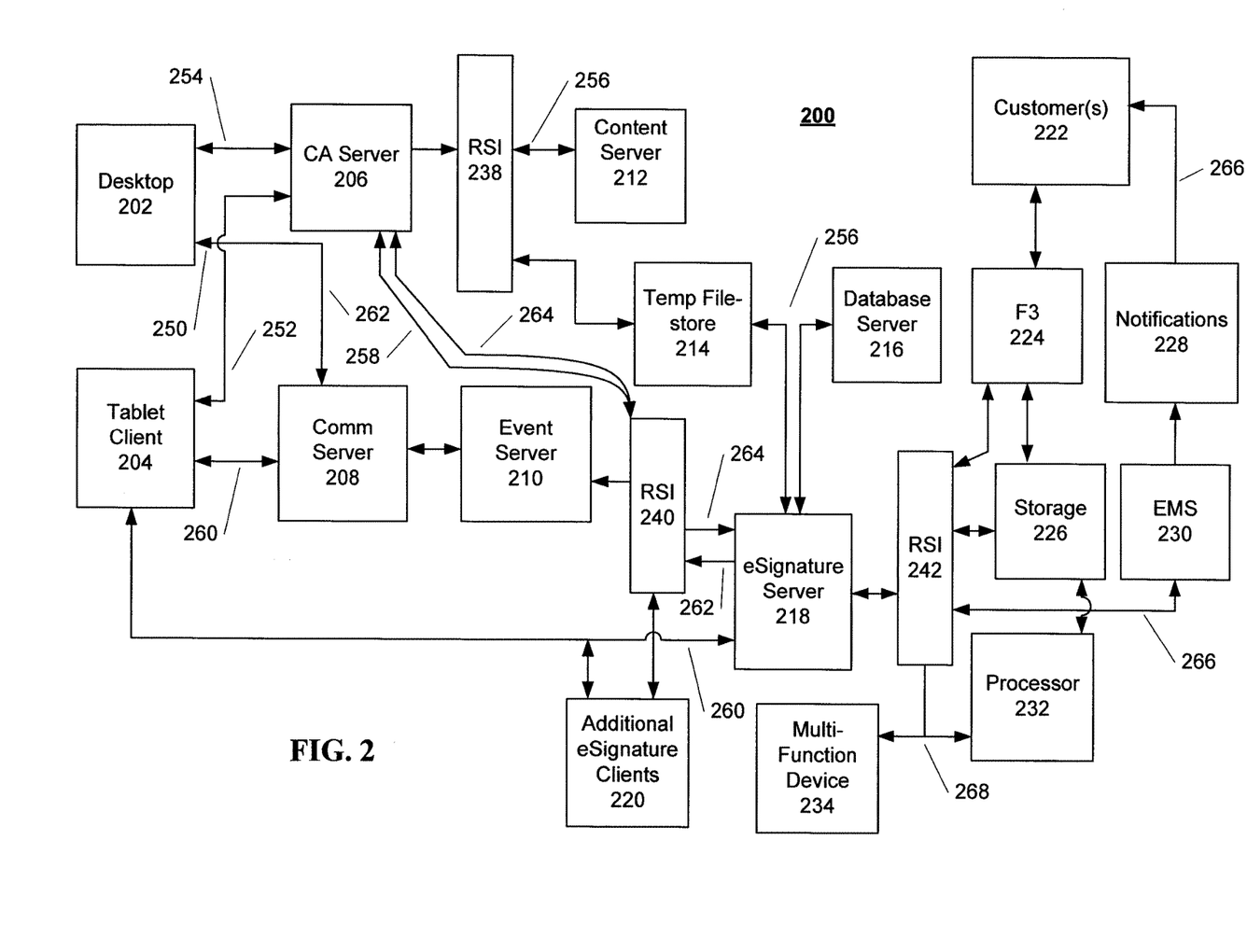
FIG. 2 is a diagram of a system in accordance with an exemplary embodiment of the invention.

FIG. 2 is a system according to an exemplary embodiment of the invention. System 200 may provide various functionality and features associated with the program. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. For example, some of the modules or functionality associated with the modules may be supported by a separate application or platform. Other implementations and architectures may be realized. It should be appreciated that system 100 may be integrated into and run on a computer, which may include a programmed processing machine which has one or more processors. Such a processing machine may execute instructions stored in a memory to process the data. System 100 may be integrated into and run on one or more computer networks which may each have one of more computers associated therewith. Further, while a particular structure or type of component is shown, this structure is meant to be exemplary, as other structure or components may be able to be substituted to perform the functions described.

As noted above, the processing machine executes the instructions that are stored in the memory or memories or persistent data storage devices to process data. This processing of data may be in response to commands by a user or users of the processing machine, in response to previous processing, in response to a request by another processing machine and/or any other input, for example. As described herein, a module performing functionality may have a processor.

According to exemplary embodiments, the system 200 may be configured to carry out the methods as described herein. For example, the method 100 may be conducted by the system 200. The system 200 may support other methods and be communicatively coupled to other systems. FIG. 2 may have various connection arrows between its components. The connection arrows may indicate a direction of data exchange between the components. These directions are exemplary and non-limiting in nature.

The system 200 may have a desktop 202. The desktop 202 may be computer workstation. For example, the workstation may be a desktop or a laptop computer or other computing device, including portable computing devices. In some embodiments, the workstation may be a thin client, such that the majority of the processing may be performed in the other components of the system, or a thick client, such that the majority of the processing may be performed on the workstation. While one desktop 202 is depicted in FIG. 2, more than one desktop 202 may used with the system 200. The desktop 202 may be in an persistent listening type mode where it actively awaits commands and instructions from the various components it is communicatively coupled or linked to. It may use a persistent Hypertext Transfer Protocol (HTTP) type connection.

A tablet client 204 may be present. The tablet client 204 may be a tablet computing device or a second computer device. The tablet client 204 may be a portable computing device. For example, the portable computing device may be, by way of non-limiting examples, a mobile phone (e.g., cell or cellular phones), a smart phone (e.g., iPhones, Android based phones, or Blackberry devices), a personal digital assistant (PDA) (e.g., Palm devices), an e-reader, a laptop, a netbook, or another portable computing device. While one tablet client 204 is depicted in FIG. 2, more than one tablet client or other computing device may be used with the system 200. The tablet client 204 may be in an persistent listening type mode or active state such that the tablet client 204 actively awaits commands and instructions from the various components it is communicatively coupled or linked to. It may use a persistent HTTP type connection. The tablet client 204 may be dependent upon the desktop for all commands and instructions, although in certain cases the tablet client may provide commands and instructions.

The desktop 202 and the tablet client 204 may be communicatively coupled or linked to a customer assist or CA server 206. The desktop 202 and the tablet client 204 may be communicatively coupled to the CA server 206 through a wireless or wired connection. Each may be communicatively coupled to the CA server 206 in a different manner. For example, the desktop may be communicatively coupled through a wired connection and the tablet client may be communicatively coupled through a wireless connection. Alternatively, the coupling may be in the same manner.

The desktop 202 and the tablet client 204 may be communicatively coupled or linked to a communications or comm server 208. The desktop 202 and the tablet client 204 may be communicatively coupled to the comm server 208 through a wireless or wired connection. Each may be communicatively coupled to the comm server 208 in a different manner. For example, the desktop may be communicatively coupled through a wired connection and the tablet client may be communicatively coupled through a wireless connection. Alternatively, the coupling may be in the same manner.

The comm server 208 may be communicatively coupled to an event server 210. The event server 210 may serve as a router for events and communications to ensure that such data reaches the correct comm server 208 for a particular session. The CA server 206 may be communicatively coupled to a content server 212 and a temporary filestore 214. A Retail Shard Infrastructure or RSI 238 may be placed between the CA server 206 and the content server 212 and the temporary filestore 214. The RSI 238, 240 and 242 may be the same component. The RSI may be a series of servers configured as middleware. For example, the RSI may act as a business service layer. The RSI 238 may receive the documents from the content server 212 and populate customer information in the documents before sending the temporary filestore 214. The content server 212 may store blank documents for various transactions. The content server 212 may forward a copy of the required documents upon a request from the CA server 206.

The tablet client 204 may be communicatively coupled to an eSignature server 218 and additional eSignature clients 220. The eSignature server 218 may be linked to a RSI 240 to the event server 210. The eSignature server 218 may be communicatively coupled to the temporary filestore 214 and a database server 216. The temporary filestore 214 may act as a temporary or interim holding area for the pre-populated documents requested for a transaction. Once the eSignature server 218 is ready for the documents, it may retrieve them from the temporary filestore 214. The eSignature server 218 may then use the database server 216 to store documents being actively used during a transaction.

The additional eSignature clients 220 may represent other applications that may use the system 200. These clients 220 may access and use the system 200 by acting in place of or in addition to the CA server 206. For example, the eSignature clients 220 may be associated with other lines of business or departments of the financial institution. As such, the eSignature clients 220 may provide additional information into the data flow and method described herein. Alternatively, the eSignature clients 220 may enable those other departments to use the methods and systems described herein. For example, an eSignature client 220 may be associated with the marketing department or advertising department. This eSignature client may enable that department to use the system for collaboration on documents, such as, for example, having a third party review and sign documents relating to a marketing or advertising campaign.

Further, the eSignature server 218 may be communicatively, through a RSI 242, to a flexible file folder (F3) 224, a storage area 226, and an EMS 230. The storage 226 may serve as the ultimate storage location for completed documents. The storage area 226 may be accessed by a customer through the flexible file folder 224. The flexible file folder 224 may serve as an interface to the storage area 226. A customer 222 may access the flexible file folder 224 through an interface. For example, the customer 222 may access the F3 224 through an Internet website. The EMS 230 may be an enterprise middleware system. The EMS 230 may serve as an application layer for forwarding events to the notifications 228.

The RSI 242 may be linked to a processor 232. The processor 232 may have a pre-processor associated therewith.

A multi-function device 234 may be included in the system 200. The multi-function device 234 may be used to digitally input information from documents to the system 200. For example, the multi-function device 234 may have a scanner which may be used to scan documents associated with a transaction. The scanned documents may be processed by the processor 232 and stored in the storage 226.

An exemplary process flow is depicted in FIG. 2. At 250, a financial institution representative or banker may log into the desktop 202. A log in identification may be used. For example, a standard ID or SID may be used to login. The log-in request may be sent to the CA server 206. This log-in request may be performed using a control connection. The control connection may be a persistent HTTP connection. This SID may be used to establish and associate the session with a particular user.

At 252, the banker may log into the tablet client 204 with a login. For example, the login may be the same SID used at 250. Alternatively, a customer may log into the tablet client 204. The customer may use the same SID as used to log into the desktop 202. The SID may be provided to the customer. Once the tablet client 204 is logged into, a connection may be established with the comm server 208 and the tablet client 204 may be associated or collaboratively coupled with the desktop 202. This log-in may be performed using a session request or HTTP connection. By logging in with the same SID, the collaboration session may be started.

In some embodiments, the tablet client 204 may be remotely located or geographically separate from the desktop 204. A link or other electronic communication may be forwarded to the tablet client 204 which may allow the establishment of the collaboration session. For example, a link may be emailed to the tablet client 204 which when clicked or activated provides the log-in to the session as the SID would.

At 254, the banker may capture a customer's information in a new account flow with the CA server 206. This action may be performed using a session request or HTTP connection.

At 256, the CA server 206 may request that retrieval of documents from the content server 212 through the RSI 238. The RSI 238 may automatically fill-in or pre-populate the customer's information into the documents. The RSI 238 may forward the documents to the temporary filestore 214 for storage. This action may be performed using a Simple Object Access Protocol or SOAP message. The storage at the temporary filestore 214 may be of a transitory or interim nature.

At 258, the CA server 206 may send a list of the documents to the tablet client 204 via the comm server 208 and the event server 210 using the RSI 240. This action may be performed using a Simple Object Access Protocol or SOAP message.

At 260, the tablet client 204 may contact the eSignature server 218 to access the documents. This action may be performed using a session request or HTTP connection. The eSignature server 218 may retrieve the documents from the temporary filestore 214. The eSignature server 218 may convert the documents for display on the tablet client 204. The eSignature server 218 may store these converted documents in the database server 216. The eSignature server 218 may provide a web-based interface for navigation and signing of the documents to the tablet client 204. This action may be performed using a control connection. The control connection may be a persistent HTTP connection.

At 262, during the navigation and signing of the documents, the eSignature server 218 may send or transmit events, via a SOAP message, to the desktop 202 via the comm server 208 and the event server 210. The CA server 206 may use this information to update the status of the documents in the file structure and to update a display on the desktop 202. The desktop 202 may receive updates that provide information as to what the tablet client 204 is doing. The tablet client 204, that is the user thereof, may be unaware of the information being provided to the desktop, such as the events from the review process. The desktop 202 and the tablet client 204 may therefore be deemed to be loosely coupled during the collaboration in a non-obtrusive manner. It should further be appreciated that this coupling may occur independent of the applications being used for the process, such as the document review. Stated differently, the collaboration is application independent.

The updates may be provided in the form of messages or other interface updates on the desktop 204. In some embodiments, the same document may be opened on the desktop 204 to the same location being viewed on the tablet client 204. Additional information may be displayed on the desktop 202. For example, instructions or other guidance may be displayed for the user of the desktop 202 regarding the actions being taken on the tablet client 204. This action may be performed using a control connection. The control connection may be a persistent HTTP connection.

At 264, at the conclusion of the transaction, the CA server 206 may notify the eSignature server 218 to send the documents to the storage 226 through the RSI 242 for storage. This action may be performed using a SOAP message. This storage may be of a long term nature.

At 266, the eSignature server 218 may send flattened and watermarked copies of the documents to the F3 224. The eSignature server 218 may transmit a message to the notifications server 228 through the EMS 230. The notifications server 228 may transmit a notification regarding the documents to the customer 222.

At 268, for certain accounts, the eSignature server 218 may send an additional copy of the documents to the processor 232 to be merged with identification or additional documents sent from the multifunction device 236. A preprocessor (not shown) may be located in the data path prior to the processor 232 to receive, filter, and format documents or information transmitted to the processor 232. For example, this action may be performed for non-United States accounts. A data transfer connection may be used for this action. These additional documents may stored in storage 226. The processor 226 may serve as a workflow management interface and may be used to manual intervention or manual review of documents. The processor 232 may discard documents after review and finalizing the documents. For example, the processor 232 may delete working copies of documents.

Figure 3:
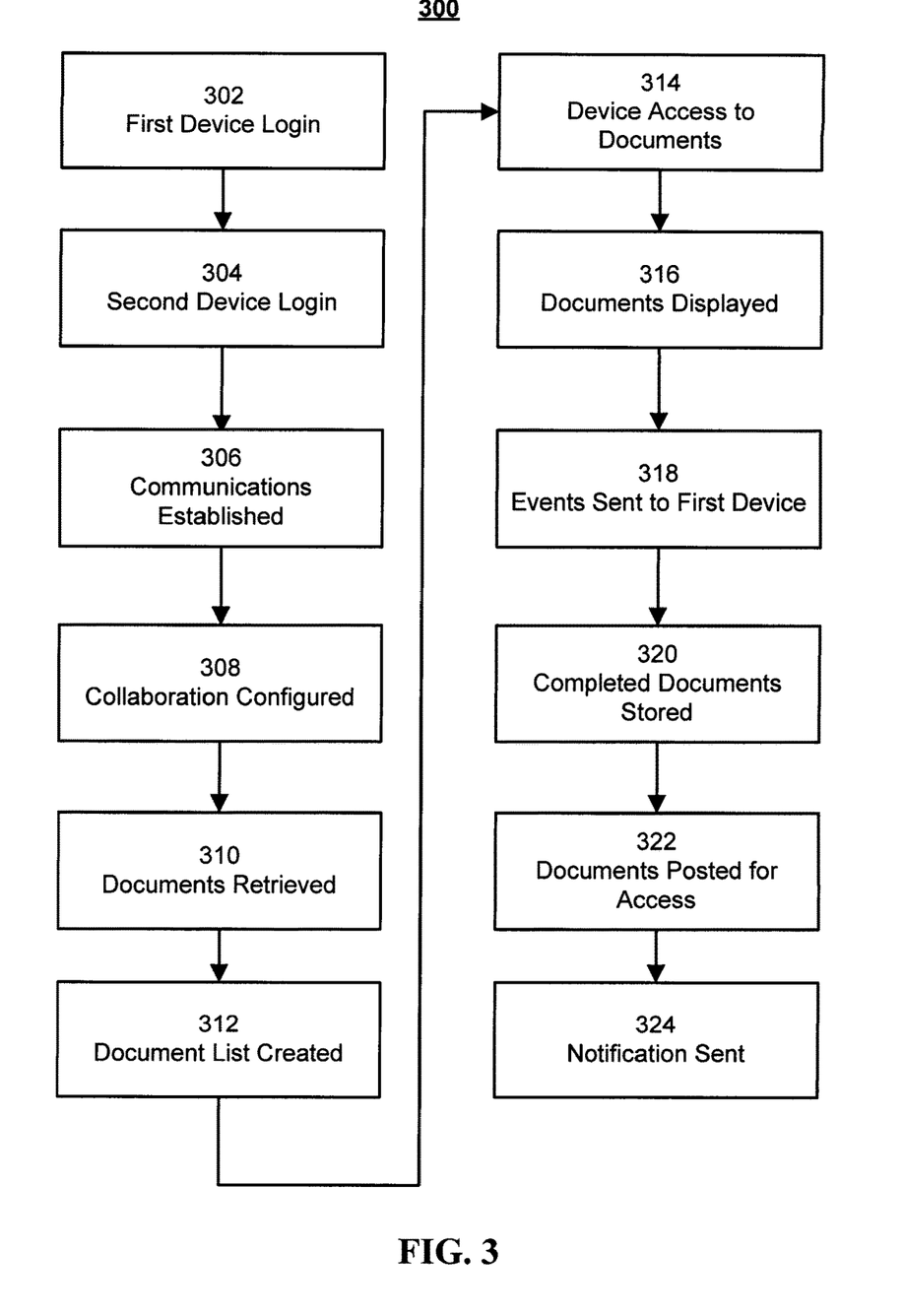
FIG. 3 is a flow chart of a method of collaboration in accordance with an exemplary embodiment of the invention.

FIG. 3 depicts a flow chart of a method of collaboration using a portable electronic device according to exemplary embodiments of the invention. Exemplary method 300 is provided by way of example, as there are a variety of ways to carry out the methods disclosed herein. The method 300 as shown in FIG. 3 may be executed or otherwise performed by one or a combination of various systems, such as a computer implemented system. Each block shown in FIG. 3 represents one or more processes, methods, and/or subroutines carried out in the exemplary method 300. Each block may have an associated processing machine or the blocks depicted may be carried out through one processor machine.

At block 302, a first device is logged into. The first device may be a workstation computer. For example, the first device may be desktop or laptop computer. In some embodiments, the first device may be a thin client, such that the majority of the processing may be performed in the other components of the system, or a thick client, such that the majority of the processing may be performed on the first device. The first device may be a portable computing device. For example, the first device may be a computing device that is the same as or similar to the second device described at block 304. The first device may be communicatively coupled to one or more servers or other computing devices that electronically interact during the method described herein. The first device may be communicatively coupled to one or more computer networks through a wireless or wired connection. For example, data may be transmitted and/or received using an Ethernet connection, a fiber connection, a traditional phone wireline connection, a cable connection or other wired network connection. The first device may have peripheral devices attached thereto. For example, the workstation may have multi-function device that has a printer and scanner associated therewith. The peripheral device(s) may be connected to a computer network.

The first device may be logged into by a first user.

At block 304, a second device is logged into. The second device may be a similar computing device to the first device described above at block 302. The first user may log into the second device. Alternatively, a second user may log into the second device. The same log in may be used on the second device as used on the first device. The second device may be a portable electronic device. For example, the second device may be a tablet computing device. Other portable electronic devices may be used such as, by way of non-limiting examples, mobile phones (e.g., cell or cellular phones), smart phones (e.g., iPhones, Android based phones, or Blackberry devices), personal digital assistants (PDAs) (e.g., Palm devices), e-readers, laptops, netbooks, or other portable computing devices. The second device may have a display screen that is touch sensitive. The display screen may accept touch inputs from a human finger or other device, such as a stylus or pen. In some embodiments, input to the second device may be performed using a keyboard or a pointing device. For example, a mouse or touch-pad may be used to perform inputs. A virtual keyboard may be displayed on the screen of the portable electronic device for inputs; that is, the keyboard may be used via the touch screen. A combination of input devices and methods may be used. The device may be associated with or owned by the financial institution.

More than one second device may be present; that is, a third device, a fourth device, etc. through an n device may be present. For example, there may be two or more devices. Accordingly, the steps of the method described herein may be applied to such multiple devices. The multiple devices may each conduct the method steps and may each communicate with (such as transmitting to and receiving data from) the first device.

The second device may have a number of applications, widgets, interfaces, and/or programs installed. For example, the second device may have certain software installed. One or more applications, widgets, interfaces, and programs may be installed to support the embodiments described herein. Additional applications, widgets, interfaces, and programs may be installed.

At block 306, communications are established. The communications may be established between the first device and the second device such that the first device and the second device are communicatively coupled. The first device and the second device may be communicatively to a server which may handle the communications between the devices. Communications with other, additional computing devices may be established. For example, communications with one or more servers and/or file storage devices may be established. The communications may be established by correlating the log in between the first device and the second device. For example, a correlation of the SID or other log in identifier may be performed between the first device and the second device.

Communications may be electronically established over a wireless network between the first device and the second device. For example, the first device and the second device may communicate and/or transmit/receive data using a wireless signal. The wireless signal may consist of Bluetooth, Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Transmission Control Protocol/Internet (TCP/IP) Protocols, or other protocols and/or systems suitable for transmitting and receiving data between the first and second device. A standard wireless protocol may be used. For example, the wireless protocol may include IEEE 802.11a, 802.11b, 802.11g, and 802.11n.

Alternatively, the first device and the second device may communicate over a wired network. For example, data may be transmitted and/or received using an Ethernet connection, a fiber connection, a traditional phone wireline connection, a cable connection or other wired network connection.

At block 308, collaboration is configured. The desired collaboration may be configured. The first user may select, through an application, widget, program, and/or interface, a particular action to conduct on the first device. The collaboration may be between the first device and the second device. This action may be chosen from a menu or selection of transactions. For example, the action may be reviewing a set of documents or collaborating on a team project. These examples are meant to be exemplary and non-limiting. The collaboration may be established by correlating the log in between the first device and the second device. In some embodiments, the collaboration may be established as part of the communication establishment between the first device and the second device. The collaboration may be unobtrusive and non noticeable to the second user, for example. The first and second device may be deemed to be loosely coupled. Further, the first device and the second device may use different applications to conduct the collaborative process. The first device may not have control over the second device during the collaboration.

At block 310, documents are retrieved or accessed. The documents may be retrieved from a content server or database. The documents may be placed into a temporary file store or other location to await further action. The documents retrieved may be related to the selected action. For example, the action may be to review a proposal among two different partners. The use of the term "documents" is meant to be non-limiting and encompass a variety of forms, requests, brochures, lists, web pages, legal notices, images, etc. as appreciated by one of ordinary skill in the art.

At block 312, a document list is sent to the first device and second device. The first device may contact a server for the documents. The documents may be pushed to the first and second device by the server. A list of available documents may be electronically provided to both the first device and the second device and an index, file, or folder structure may be created or provided.

At block 314, the device accesses the documents. The device may access the documents from the file store. The device may perform a set of conversions on the documents for display thereon.

At block 316, the documents are displayed. The documents are displayed upon the first and second devices. An appropriate interface for navigating the documents may be provided. For example, a web-based interface may be provided to navigate the documents.

As part of the document display, the users of the first and second device may be able to input information into the documents through the interfaces provided with the devices. For example, the first user and the second user may collaboratively conduct a review of the displayed documents and make changes, edits, and comments. The review may be conducted in a collaborative manner between the first and second devices. The first device may be in control and be the "master" type device. The first and second user may electronically sign the documents as part of the review.

According to some embodiments, as described above, additional devices may be required beyond the second device with additional users beyond the second user. For example, the collaboration may require or involve a third user. For these types of situations, an additional or third device may be provided. The additional device may be logged into and establish communications as described above. The additional device may establish a collaboration relationship to the first and second devices. The additional device may display the same documents as the other devices. The first device may be in a controlling or master relationship. Information may be captured from the additional device as described for the first device. The workstation may display the events from the additional device as for the other devices. More than one additional device may be required. For example, two or more additional devices may be used. Each additional device may be capable of performing the functions described herein. The additional devices may display the same documents as the first device or the other additional devices. Alternatively, each additional device may display different documents and receive different inputs. In some embodiments, the additional devices may be geographically separated from the workstation.

At block 318, events are sent to the workstation. During review and manipulation of the documents on the second device, the first device may receive inputs from the second device. These inputs provide information to the first device such that the first may display the same information being displayed upon the second device. The first device may display additional information received from the second device such as any actions taken upon the second device. The first user may then be able to collaboratively interact with the second user. It should be appreciated that that the first device may receive such information and interaction from any additional devices present. In this manner, the first device may act as a control point or moderator of the collaboration. For example, as the second user, through the second device, performs a review of the documents and makes comments or edits, the first device may receive notification of these comments and edits on the documents. The first device may perform actions upon the documents also. The second device may receive any updated documents.

It should appreciated that any collaboration, such as a document review process, may be iterative in nature. The second user may review and complete a first set of documents which may determine whether a second or subsequent set is presented for review.

At block 320, the completed documents are stored. Upon completion of required actions the documents are forwarded for storage. For example, upon completion of document review and editing, the documents are electronically forwarded from the second device or the first device to a server for storage. The storage process may involve digitally formatting and indexing the documents for storage. For example, the copies of the documents reviewed may be watermarked as such. In some embodiments, the collaboration may not be completed in one session. The collaboration or review may be put into a suspended or pending state and then resumed at a later session, be able to resume at the same point where it left off. When the the session is resumed, the first and second device's display may be returned to the point where the session with suspended; that is, the display at the second session may be the same as when the first session was suspended at the point in the document(s) where the session left off.

It should be appreciated that during the collaboration supporting documents, external to the electronic versions, may be required. These supporting documents may be digitally imaged into the system using an appropriate peripheral device which may be communicatively coupled to the first device. For example, the first user may scan the documents using a scanner or multi-function device. Once digitally imaged, the supporting documents may be formatted, indexed, and/or watermarked. The supporting documents may be stored with the completed documents.

During the collaboration and review process, an audit trail may be logged. This audit trail may be a record of what occurred during the process. The audit trail may be stored with the documents. According to some embodiments, the documents and audit trail may be hashed and cryptographically sealed to provide a secure record of the session.

All documents reviewed may be stored. The documents may be tagged or watermarked appropriately to indicate the status of the document, including indicating the "official" signed versions of the documents, either electronically signed or physically signed. The documents and audit trail may provide a tracking of all events that occurred during the transactions.

At block 322, the reviewed documents are posted for access. The posting may be to a web server for access through an Internet site. A specified file server and database may be used to support access to the documents. Through the access, users may be able to view, download, and/or print the documents. In some embodiments, the method may be provided for correcting errors in the documents.

At block 324, a notification is sent. The notification may be to users and other interested parties regarding the posting of the documents for access. The notification may be sent electronically. For example, the notification may be sent via electronic mail, text message, and/or a Short Message Service (SMS) message.

According to some embodiments, the customer and the financial institution representative may be physically separate. For example, the customer may be located in one geographic location and the representative may be a second geographic location. The customer may be using their own portable electronic device. The portable electronic device may have an Internet connection. In some embodiments, the customer may be located at a branch office of the financial institution and have their portable electronic device connected to the financial institution's network, either by a wireless or wired connection. The representative may be located in a different location. For example, the representative may be located at another branch office of the financial institution.

The method 100 may be applied in this configuration. However, an added video and audio link capability may be required. The desktop and the portable electronic device may have a digital imaging device, such as a camera. This capability may be used to allow the customer and the representative to view each other. They may view a digitally transmitted image upon the display of the desktop and the portable electronic device. The digital imaging device may enable the customer to interact on a real-time basis with the representative to complete the transaction. An audio capability may be provided. The audio capability may be a part of the video capability. For example, the desktop and portable electronic device may have access to Skype or other video messaging services. As part of the login process and connection process described above, the video and audio links may be established. According to some embodiments, a real time chat or other messaging capability may be used in place of or in addition to the video and audio capability.

Hereinafter, aspects of implementation of the inventions will be described. As described above, the method of the invention may be computer implemented as a system. The system of the invention or portions of the system of the invention may be in the form of a "processing machine," for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

The description of exemplary embodiments describes servers, portable electronic devices, and other computing devices that may include one or more modules, some of which are explicitly depicted in the figures, others are not. As used herein, the term "module" may be understood to refer to executable software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices (e.g., servers) instead of or in addition to the function performed at the particular module. Further, the modules may be implemented across multiple devices and/or other components local or remote to one another. Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, portable electronic devices, client devices, computers, etc.) separately. The functions described as being performed at various components may be performed at other components, and the various components may be combined and/or separated. Other modifications also may be made.

According to exemplary embodiments, the systems and methods may be computer implemented using one or more computers, incorporating computer processors. The computer implementation may include a combination of software and hardware. The computers may communicate over a computer based network. The computers may have software installed thereon configured to execute the methods of the exemplary embodiments. The software may be in the form of modules designed to cause a computer processor to execute specific tasks. The computers may be configured with hardware to execute specific tasks. As should be appreciated, a variety of computer based configurations are possible.

The processing machine described above may also utilize any of a wide variety of other technologies including a special purpose computer, a computer system including a microcomputer, mini-computer or mainframe for example, a programmed microprocessor, a micro-controller, a PICE (peripheral integrated circuit element), a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices for example capable of implementing the steps of the process of the invention.

It is appreciated that in order to practice the method of the invention as described above, it is not necessary that the processors and/or the memories of the processing machine be physically located in the same geographical place. For example, each of the processors and the memories and the data stores used in the invention may be located in geographically distinct locations and connected so as to communicate in any suitable manner. Additionally, it is appreciated that each of the processor and/or the memory and/or data stores may be composed of different physical pieces of equipment. Accordingly, it is not necessary that the processor be one single piece of equipment in one location and that the memory be another single piece of equipment in another location. For example, it is contemplated that the processor may be two or more pieces of equipment in two or more different physical locations. These two or more distinct pieces of equipment may be connected in any suitable manner. Additionally, the memory may include two or more portions of memory in two or more physical locations. Additionally, the data storage may include two or more components or two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions. It is also appreciated that the data storage performed by two distinct components as described above may, in accordance with a further embodiment of the invention, be performed by a single component. Further, the data storage performed by one distinct component as described above may be performed by two distinct components.

Further, various technologies may be used to provide communication between the various processors and/or memories, as well as to allow the processors and/or the memories of the invention to communicate with any other entity; e.g., so as to obtain further instructions or to access and use remote memory stores, for example. Such technologies used to provide such communication might include a network, such as a computer network, for example, the Internet, Intranet, Extranet, LAN, or any client server system that provides communication of any capacity or bandwidth, for example. Such communications technologies may use any suitable protocol such as TCP/IP, UDP, or OSI, for example. It should be appreciated that examples of computer networks used in the preceding description of exemplary embodiments, such as the Internet, are meant to be non-limiting and exemplary in nature.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming or any other suitable programming form. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. For example, written lines of programming code or source code, in a particular programming language, are converted to machine language using a compiler, assembler or interpreter. The machine language is binary coded machine instructions that are specific to a particular type of processing machine, e.g., to a particular type of computer, for example. The computer understands the machine language.

Any suitable programming language may be used in accordance with the various embodiments of the invention. Illustratively, the programming language used may include assembly language, Ada, APL, Basic, C, C++, C#, COBOL, dBase, Forth, Fortran, Java, Modula-2, Pascal, Prolog, REXX, Ruby, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, e.g., the software for example, that enables the computer operating system to perform the operations described above may be contained on any of a wide variety of computer readable media, as desired. Further, the data for example processed by the set of instructions might also be contained on any of a wide variety of media or medium. For example, the particular medium, e.g., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, e.g., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

While the embodiments have been particularly shown and described within the framework of banking and financial services, it will be appreciated that variations and modifications may be effected by a person of ordinary skill in the art without departing from the scope of the invention. Furthermore, one of ordinary skill in the art will recognize that such processes and systems do not need to be restricted to the specific embodiments described herein. Other embodiments, combinations of the present embodiments, and uses and advantages of the present invention will be apparent to those skilled in the art from consideration of the specification and practice of the invention disclosed herein. For example, the present invention may be effectively implemented for various collaboration activities where multiple persons may be required to interact and review documents. The specification and examples should be considered exemplary.

What is claimed is:

1. A computer implemented method, comprising:
communicatively coupling a first computing device with a second computing device;
electronically capturing, at the first computing device, demographic information from a customer, the demographic information comprising one or more of a name, address, date of birth, picture, and signature;
determining an offer or advertisement of a product or service to present to the customer using a decisioning tool based upon the captured information;
presenting, electronically, the offer or advertisement to the customer, using the second computing device;
receiving a selection of a transaction from the customer, based on the offer or advertisement;
retrieving, by a computer processor, one or more documents pertaining to the transaction;

populating, by the computer processor, one or more information fields in the one or more documents based on the demographic information;

granting access to the first and second computing devices to the one or more documents;

displaying the one or more documents on the second computing device;

receiving, by the computer processor, from the second computing device, an electronic signature, from the customer, on the one or more documents;

forwarding events associated with the second computing device to the first computing device, wherein the events comprise information inputs;

electronically storing the one or more documents that have been electronically signed;

posting, by the computer processor, the one or more documents for access by the customer; and sending, by the computer processor, an electronic notification to the customer that the one or more documents are posted for access, the electronic notification comprising one or more of an email, a text message, and a SMS message.

2. The computer implemented method of claim 1, wherein the first computing device comprises a computer workstation.

3. The computer implemented method of claim 1, wherein the second computing device is a portable electronic device.

4. The computer implemented method of claim 3, wherein the portable electronic device comprises a handheld computing device or a tablet computing device.

5. The computer implemented method of claim 1, wherein the first computing device is associated with a financial institution.

6. The computer implemented method of claim 1, wherein the one or more documents are accessible through an Internet site following the step of posting.

7. The computer implemented method of claim 1, wherein the second computing device is communicatively coupled to the first computing device using a wireless connection which is established following completion of a successful log-in by a user, differing from the customer, to the first computing device and the second computing device.

8. The computer implemented method of claim 1, wherein the demographic information is electronically captured from an identification item provided by the customer.

9. The computer implemented method of claim 1, wherein the first computing device is in a first location and the second computing device is in a second location and the first location and the second location are different geographic locations.

10. A computer implemented system, comprising:
a first computing device;
a second computing device;
one or more servers;
a computer based network communicatively coupling the first computing device, the second computing device, and the one or more servers;
the one or more servers being configured to:
  determine an offer or advertisement of a product or service to present to the customer using a decisioning tool based upon captured demographic information from a customer;
  display the offer or advertisement to the customer using the second computing device;
  receive a selection of a transaction from the customer, based on the offer or advertisement;
  retrieve one or more documents pertaining to the transaction;
  automatically populate one or more information fields in the one or more documents based upon the captured demographic information;
  grant access to the one or more documents to the first and second computing devices;
  cause the display of the one or more documents on the second computing device;
  process information inputs received from the second computing device that comprise interactions between the customer and the one or more documents wherein the interactions with the one or more documents comprise receiving an electronic signature from the customer through the second computing device;
  receive events from the second computing device;
  forward the events to the first computing device;
  store the one or more documents;
  post the one or more documents for subsequent access by the customer; and
  send an electronic notification to the customer that the one or more documents are posted for access, the electronic notification comprising one or more of an email, a text message, and a SMS message.

11. The computer implemented system of claim 10, wherein the first computing device comprises a computer workstation.

12. The computer implemented system of claim 10, wherein the second computing device is a portable electronic device.

13. The computer implemented system of claim 12, wherein the portable electronic device comprises a handheld or tablet computing device.

14. The computer implemented system of claim 10, wherein the first computing device is associated with a financial institution.

15. The computer implemented system of claim 10, wherein the one or more documents are accessible, following the posting, through an Internet site.

16. The computer implemented system of claim 10, wherein the demographic information is electronically captured from an identification item provided by the customer.

17. The computer implemented system of claim 10, wherein the first computing device is in a first location and the second computing device is in a second location and the first location and the second location are different geographic locations.

18. A computer implemented method comprising:
communicatively coupling a first computing device with a second computing device, wherein a first user is associated with the first computing device and a second user is associated with the second computing device;
determining an offer or advertisement to present to the second user using a decisioning tool based upon information input by the second user into a profile;
presenting, electronically, the offer or advertisement to the second user, using the second computing device;
retrieving, by a computer processor, one or more documents for the first user and the second user to collaborate on;
granting access to the first and second computing devices to the one or more documents;
displaying the one or more documents on the first and second computing devices wherein the display of the one or more documents occurs after the presentation of the offer or advertisement and is based on the offer or advertisement;

receiving, by the computer processor, inputs, from the second computing device, comprising interaction between the second user and the one or more documents;

forwarding events, comprising at least the inputs, associated with the second computing device to the first computing device;

electronically tagging or watermarking the one or more documents, upon completion of the collaboration between the first and second users, such that the tag or watermark indicates the final version of the one or more documents; and electronically storing the one or more documents for subsequent access by the first and second users.

19. The computer implemented method of claim 18, wherein the first computing device comprises a computer workstation.

20. The computer implemented method of claim 18, wherein the second computing device is a portable electronic device.

21. The computer implemented method of claim 20, wherein the portable electronic device comprises a handheld computing device or a tablet computing device.

22. The computer implemented method of claim 18, wherein the first computing device and the second computing device are the same type of computing device.

23. The computer implemented method of claim 18, wherein the second computing device is communicatively coupled to the first computing device using a wireless connection which is established following completion of a successful log-in by the first user to the first computing device and the second computing device.

24. The computer implemented method of claim 18, wherein the first computing device is in a first location and the second computing device is in a second location and the first location and the second location are different geographic locations.

25. The computer implemented method of claim 1, wherein the display of the one or more documents occurs after the presentation of the offer or advertisement.

26. The computer implemented system of claim 10, wherein the display of the one or more documents occurs after the presentation of the offer or advertisement.

27. The computer implemented method of claim 1, wherein the electronic signature comprises the full signature of the customer.

28. The computer implemented system of claim 10, wherein the electronic signature comprises the full signature of the customer.

* * * * *